(12) United States Patent
DeAnna et al.

(10) Patent No.: US 8,978,021 B2
(45) Date of Patent: Mar. 10, 2015

(54) SYSTEM AND METHOD FOR PERVASIVE SOFTWARE PLATFORM-BASED MODEL DRIVEN ARCHITECTURE TRANSACTION AWARE APPLICATION GENERATOR

(75) Inventors: Robert DeAnna, Frisco, TX (US);
Robert W. Peterson, Plano, TX (US);
Thomas T. Wheeler, Frisco, TX (US);
Qin Ye, Plano, TX (US)

(73) Assignee: Paul A. Lipari, Frisco, TX (US)

( * ) Notice: Subject to any disclaimer, the term of this patent is extended or adjusted under 35 U.S.C. 154(b) by 283 days.

(21) Appl. No.: 13/151,782

(22) Filed: Jun. 2, 2011

(65) Prior Publication Data
US 2012/0311547 A1    Dec. 6, 2012

(51) Int. Cl.
*G06F 9/44* (2006.01)
*G06F 9/445* (2006.01)

(52) U.S. Cl.
CPC .. *G06F 8/60* (2013.01); *G06F 8/30* (2013.01); *G06F 8/70* (2013.01)
USPC ........... 717/140; 717/103; 717/106; 717/143; 717/165; 717/166

(58) Field of Classification Search
None
See application file for complete search history.

(56) References Cited

U.S. PATENT DOCUMENTS

| | | | | |
|---|---|---|---|---|
| 6,272,675 B1 * | 8/2001 | Schrab et al. | | 717/100 |
| 6,321,374 B1 * | 11/2001 | Choy | | 717/106 |
| 7,069,540 B1 * | 6/2006 | Sievert | | 717/120 |
| 7,287,037 B2 * | 10/2007 | An et al. | | 1/1 |
| 7,346,702 B2 * | 3/2008 | Haviv | | 709/238 |
| 7,404,177 B1 * | 7/2008 | Greenfield et al. | | 717/106 |
| 7,805,732 B2 * | 9/2010 | Manzano et al. | | 719/317 |
| 7,840,939 B1 * | 11/2010 | Chinnici | | 717/116 |
| 8,010,962 B2 * | 8/2011 | Tal et al. | | 717/177 |
| 2003/0018950 A1 * | 1/2003 | Sparks et al. | | 717/100 |
| 2004/0230556 A1 * | 11/2004 | Mueller et al. | | 707/1 |
| 2004/0250238 A1 * | 12/2004 | Singh et al. | | 717/108 |
| 2005/0144590 A1 * | 6/2005 | Limprecht et al. | | 717/120 |
| 2006/0236316 A1 * | 10/2006 | McDowell | | 717/168 |
| 2007/0266384 A1 * | 11/2007 | Labrou et al. | | 718/100 |
| 2010/0011340 A1 * | 1/2010 | Pandey | | 717/107 |
| 2010/0287208 A1 * | 11/2010 | Mao et al. | | 707/803 |
| 2011/0035742 A1 * | 2/2011 | Shenfield | | 717/171 |
| 2011/0047540 A1 * | 2/2011 | Williams et al. | | 717/178 |
| 2011/0078672 A1 * | 3/2011 | Stark et al. | | 717/166 |
| 2011/0231824 A1 * | 9/2011 | Chabbi et al. | | 717/126 |
| 2012/0144448 A1 * | 6/2012 | Gunawardena et al. | | 726/1 |
| 2012/0254867 A1 * | 10/2012 | Lind et al. | | 718/1 |
| 2012/0331484 A1 * | 12/2012 | Vickers et al. | | 719/316 |

OTHER PUBLICATIONS

Hrastnik, Peter, and Werner Winiwarter. "Using advanced transaction meta-models for creating transaction-aware web service environments." International Journal of Web Information Systems 1.2 (2005): 89-100.*

* cited by examiner

*Primary Examiner* — Isaac T Tecklu

(57) ABSTRACT

In developing applications for a plurality of node types, a meta-data definition of the application can be captured into an application definition module. The meta-data definition can describe the application for the plurality of node types. A code generation module can then automatically generate the application code for the plurality of node types, including transaction aware code. The code can be compiled per node type and the packaging necessary to deploy the application to the plurality of node types can also be automatically generated.

17 Claims, 11 Drawing Sheets

SYSTEM AND METHOD FOR PERVASIVE SOFTWARE PLATFORM-BASED MODEL DRIVEN ARCHITECTURE TRANSACTION AWARE APPLICATION GENERATOR

CROSS REFERENCE TO RELATED APPLICATIONS

This application is related to U.S. application Ser. No. 13/151,671 filed on Jun. 2, 2011, U.S. application Ser. No. 13/151,707 filed on Jun. 2, 2011 and U.S. application Ser. No. 13/151,594 filed on Jun. 2, 2011. The entire contents of each of these patent applications is incorporated herein by reference.

FIELD OF THE INVENTION

This disclosure relates to applications that run on multiple node and device types, and in particular to systems and methods for generating pervasive applications.

BACKGROUND OF THE INVENTION

There is an explosion of mobile and embedded devices throughout the consumer, commercial and government arenas. These devices have ever increasing processing power, data gathering power and data storage capacity. Additionally there is a growing need for advanced applications that are centered around the use case of a dynamic collection of people and devices, for some transient period of time, participated in a coordinate process, task, goal involving knowledge sharing. These types of application range from the DoD, DHS, and Commercial and Consumer worlds. The need for a software platform that enables a Distributed Knowledge Network is now very evident.

In the Applicant's copending patent application Ser. Nos. 13/151,671 and 11/151,594 referenced above, there is described a pervasive platform that enables a distributed network of agents, sensors and applications. However, there remains a need to pass user interface/presentation and process layer data either wired/wirelessly to another device or communities of devices in a completely decentralized manner. So for example, it is not possible to have an application running, that can dynamically and in an ad-hoc manner, share/move its state (data and user interface) from one device to another device or groups thereof, that span heterogeneous networks, devices and their underlying operating systems, software languages, software protocols and messaging capabilities.

What is required is a system and method for improved generation of pervasive applications.

SUMMARY OF THE INVENTION

In one aspect of the disclosure, there is provided a method for creating pervasive applications executable by a plurality of node types. The method comprises capturing a meta-data definition of the application into an application definition module, the meta-data definition describing at least the plurality of node types and whether a class of the application is transaction aware. Code per node type may be automatically generated and compiled for the plurality of node types in a code generation module, including transaction aware code. The packaging necessary to deploy the application to the plurality of node types may also be generated.

In one aspect of the disclosure, there is provided a system for generating applications comprising an application object model definition module and a code generator module. The application object model definition module provides an interface to receive inputs from a user that define an object model for an application, including whether a class of the application is transaction aware. The code generator module generates the application code for an object model of an application defined through the application object model definition module, including transaction aware code.

In one aspect of the disclosure, there is provided a pervasive computing platform comprising a device API Abstraction layer configured to operate as an interface between one or more applications operating on a device and an operating platform of the device, the device API abstraction layer comprising a universal set of APIs, the universal set of APIs comprising a transaction API that provides an abstraction of a universal set of transaction engines.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
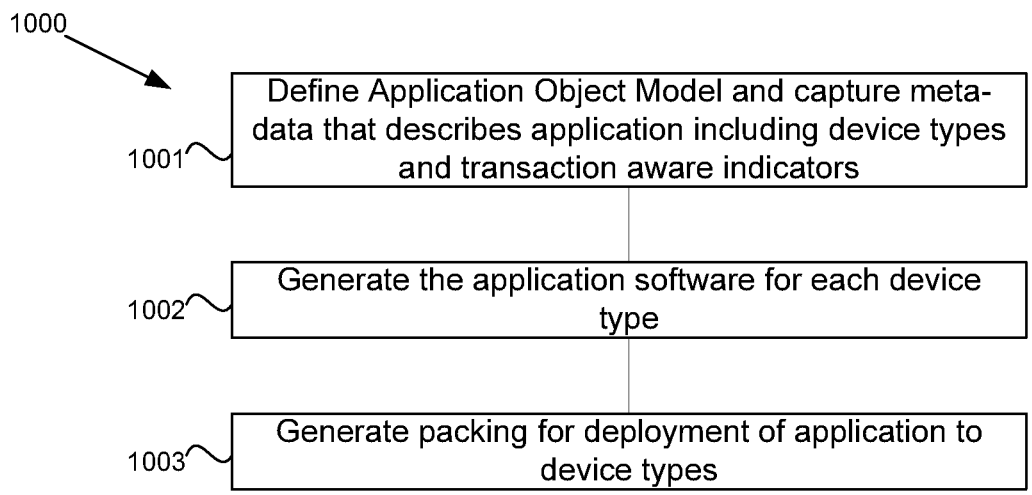
FIG. 1 shows method for generation of pervasive applications.

The Universal Distributed UI and Whiteboard embodiments to be described, would enable advanced collaborative applications that would span consumer, enterprise and governmental segments. These advanced collaborative applications would also include those that fall into the category of Distributed Knowledge Networks and Intelligent Sensor Network based applications.

These types of advanced applications will run on the Internet of Things that include smartphones, MIDs, UMPCs, Netbooks, eBooks, Auto-based Computers, Home Storage Devices, Desktops/Laptops, Routers, Switches, Sensors and on and on. This capability, at a very high level can be broken down into a Universal Distributed Business Object Whiteboard and Universal Distributed UI. There is an underlying dynamic behavior to these capabilities, that may implemented using a Universal Transaction API that allows for the incremental delivery of dynamic rule sets at runtime. The Universal Distributed UI may only pertain to devices with computer screens (i.e. faces), but the accompanying Universal Distributed Business Object Whiteboard of data apply to any device that has memory.

The systems and methods to be described allow for advanced, dynamic, collaborative capabilities across heterogeneous, ad-hoc groups of devices. This is accomplished using technology that is outlined below in conjunction with aspects that are described in the Applicant's co-pending patent applications referenced above and incorporated herein by reference. The dynamic behavior is accomplished in part by the ability to deliver rule-sets incrementally and in an atomic manner, to peer nodes at runtime for execution. This differs from prior art systems in which the actual behavior of the application is defined via predefined rules that are compiled into the application. Therefore the behavior of applications running on heterogeneous devices cannot be modified at runtime. This is in large part because there has been no software platform such as the platform described in U.S. application Ser. No. 13/151,671, referenced above, that is available with the same Peer-2-Peer and Peer-2-Group application level API's, in multiple languages, platforms, that supports multiple protocols and messaging to simply the code generation process. Also there has been no platform that allows for the dynamic, atomic distribution of rule sets and algorithms that can be executed on any peer node, or group thereof. A true pervasive software platform, such as described in U.S. application Ser. No. 13/151,671, with a single set of APIs for discovering, accessing and hosting services and data, across operating systems, languages, protocols and rule engines assists in making this feasible.

The remainder of the dynamic behavior is accomplished by the ability to update the user interfaces of groups of nodes, again at runtime, using a Universal Distributed UI. This feature also facilitates the advance collaborative capabilities. The collaborative capabilities are further enhanced by a Universal Whiteboard API, which allows for objects (data and content) to be created, viewed and updated in a transaction-aware manner, across ad-hoc communities of nodes. The transactional aspect of the whiteboard is implemented through a Universal Transaction API. A Universal Distributed UI, White Board and Transaction capability are extremely powerful in and of themselves. When built using a Pervasive MDA tool such as described in U.S. application Ser. No. 13/151,594, that runs on top of a Pervasive Software Platform, that supports the features needed, it will allow applications with these capabilities to span any device and network. The systems and methods to be described provide tools to spawn advanced Collaborative Distributed Knowledge Network and Intelligent Sensor Network based applications that will impact every aspect of our daily lives.

The present embodiments utilize the following particular aspects and capabilities of the pervasive software platform described in U.S. application Ser. No. 13/151,671, referenced above. The Pervasive Software Platform provides a Universal set of API's for Peer-2-Peer and Peer-2-Group Application Level Messaging. The relevant APIs and modules are as follows:

For both Peer-2-Peer and Peer-2-Group Application Messaging:
Pervasive Software Platform Universal Core Request Brokering Sub-Modules
Pervasive Software Platform Universal White Pages Sub-Module
Pervasive Software Platform Universal Yellow Pages Sub-Module
For Peer-2-Peer Application Messaging:
Pervasive Software Platform Universal Peer-2-Peer Messaging Sub-Module
For Peer-2-Group Application Messaging:
Pervasive Software Platform Universal Peer-2-Group Messaging Sub-Module
For Rule-set Processing:
Pervasive Software Platform Universal Rules Sub-Module The Transaction-aware Universal Business Objects that are part of the application specific APIs are available on all platforms ranging from servers to sensors, making use of the Universal Serialization Interface of the Pervasive Software Platform.

The Universal UI API has underlying implementations that communicates to the "UI engine", that is available natively on the underlying platform making use of the Universal User Interface Sub-Module of the Pervasive Software Platform.

The Universal UI Remote Service is an implementation of a local Universal UI API, which is remotely accessible, to any other device or groups of devices on the network.

In addition to the above modules, there may also be provided a Pervasive Software Platform Universal Transaction API that allows Universal Business Objects to be Transactional and participants in two-phase commits.

A Pervasive Software Platform Universal Whiteboard API may also be provided that allows Universal Business Objects to be Shared, Leased and Locked at various levels (Read Only, Read-Write, Write Only) to Peers and Peer-Groups based on pluggable policies (Security, Location, Riles, and any other Application level policies etc).

The code to provide the Universal availability of the Business Objects (i.e. via universal object serialization) are generated via a Universal Business Object Code Generation Process. The Generate Source Code Module of the pervasive software platform, described in U.S. application Ser. No. 13/151,594, referenced above, generates source code for all Mobile/Data Transfer Object (DTO) Classes and Classes needed to support various distributed messaging, payload serialization and network protocols. These classes represent the data (complex objects) that is passed/returned as part of method invocations and responses.

The code to provide the Universal Discovery, Access and Hosting of application specific Whiteboard and UI services are generated via a Universal Service Code Generation Process. This process generates Application Data Service Hosting classes for any services hosted on device, leveraging the Universal Service Discovery/Access/Host Sub-Module/API of the Pervasive Computing Platform. This process includes generating the Proxy classes that are responsible for serialization/de-serialization of payload (object reference, method arguments, exceptions and return values. These Proxy classes communicate with underlying Universal Core Request Brokering Sub-Module/API of the Pervasive Computing Platform.

An embodiment of the process for development of pervasive applications is depicted in the flowchart 1000 of FIG. 1. At step 1001, an application developer defines an object model and associated meta-data for an application through a development interface. The specification of the meta-data includes the target types any transaction aware indicators as will be described below. At step 1002, the development interface processes the meta-data as per the application object model to generate the code for the application, including transaction aware code. At step 1003, the development interface generates the packaging for deployment of the application to the indicated device types.

Figure 2:
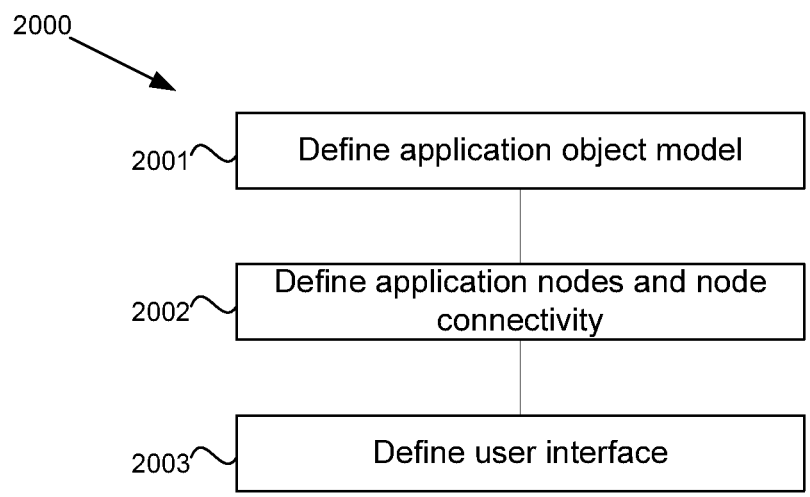
FIG. 2 shows a method for capturing meta-data of an application.

A process for capturing the application definition is shown in more detail in the flowchart 2000 of FIG. 2. At step 2001, the development interface receives inputs from the application developer that specify an application object model for the application. At step 2002, the development interface receives inputs that define the application nodes and node connectivity. At step 2003, the development interface receives a definition of the user interface.

In capturing the meta-data, a first step is to describe the Application Object Model through a tool and store it in an Object Model Repository. Above and beyond the typical data captured in an object model (classes, interfaces and their attributes, methods, exceptions etc.), certain additional information is captured such as whether the class is mobile or persistent or location-aware. For interfaces, the meta data may include whether they are remotely accessible. All classes and interfaces are associated with one or more applications.

Once the application object model has been defined, various meta-data may then be captured. This usually is only done once. For example Language Types (Java, .NET Languages, Unmanaged C++, Javascript, PHP, etc.). Virtual Machine Language Type (JME, JSE, Dalvik, .NET, CF, Silverlight etc.), Operating System Types (Linux, Win Mobile/CE/XP, Unix, Blackberry, MAC/iPhone, Symbian, etc.), Platform Types (JSE, .NET/CF, Android, Limo, Symbian, Meego, iPhone, etc.), Network Types (Wire, WiFi, GSM/CDMA, WiMax/LTE, Bluetooth, Zigbee, NFC), Database Types (Relational, Object, Object-relational, XML), Database Type Instances (SqlLite, DB2, DB2e, Oracle, Oracle Light, DB40), Protocol Types (SOAP, HTTP, XML-RPC, IIOP, RMI/IIOP, OBEX, REST, etc.) Message Types (JMS, MSMQ, RPC, Socket, DDS, etc.), Serialization Type (Binary, XML, JSON, Character etc.), Message Serialization Type. In the present embodiments, the reference table setup module is modified to further allow definition of the Transaction Server Types which are supported for an application, typically one or more of Java Transaction Server (JTS), Microsoft Transaction Server (MTS), Object Transaction Server (OTS) and mainframe transaction servers (CICS/IMS).

A process is used to capture information about the pervasive application. The process may comprise defining the node types, associating the business processes with the particular device types, and defining the messaging that occurs between node types associated with the application. For example the various Node Types participating in the application are first specified. This may be performed, for example, from drop down menus on the development interface or by dragging and dropping device types into the application. The main attributes that describe a Node Type are its device type, platform type, operating system, supported networks, preferred software development languages and virtual machines. Then the business processes that are desired are associated with the particular device type. The business process involves message flows between objects etc. This may be captured thru conventional OOA/OOD tools such as use cases, sequence diagrams and interaction diagrams.

When a business object is configured onto a node, the development interface prompts the user (developer) to specify a) whether the business object is remotely accessible, b) whether the business object is mobile (can migrate between devices), and c) whether the business object is persistable. The business intelligence objects may also be rules aware.

In the pervasive computing world with applications spanning heterogeneous device sets, there is the additional need for capturing additional type of messaging that occurs between node types associated with the application. This is done as follows. In the case of peer-2-peer messaging between two node types, there are two important pieces of information. The first is the network type that connects the two devices (IP-based or some other non-IP based network). The second is the preference for distributed protocols to be used when invoking services on the two devices. For example a first preference of Binary XML followed by IIOP, XML-RPC and SOAP, if performance is a concern. The process is similar in the case of peer-2-group messaging between groups of node types. After the collection of node types is selected, again, as above, the network type that connects these devices is selected. Then the messaging protocol is established. This list would include such protocols as TCP/IP, UDP, JMS, MSMQ or DDS for example.

Figure 3:
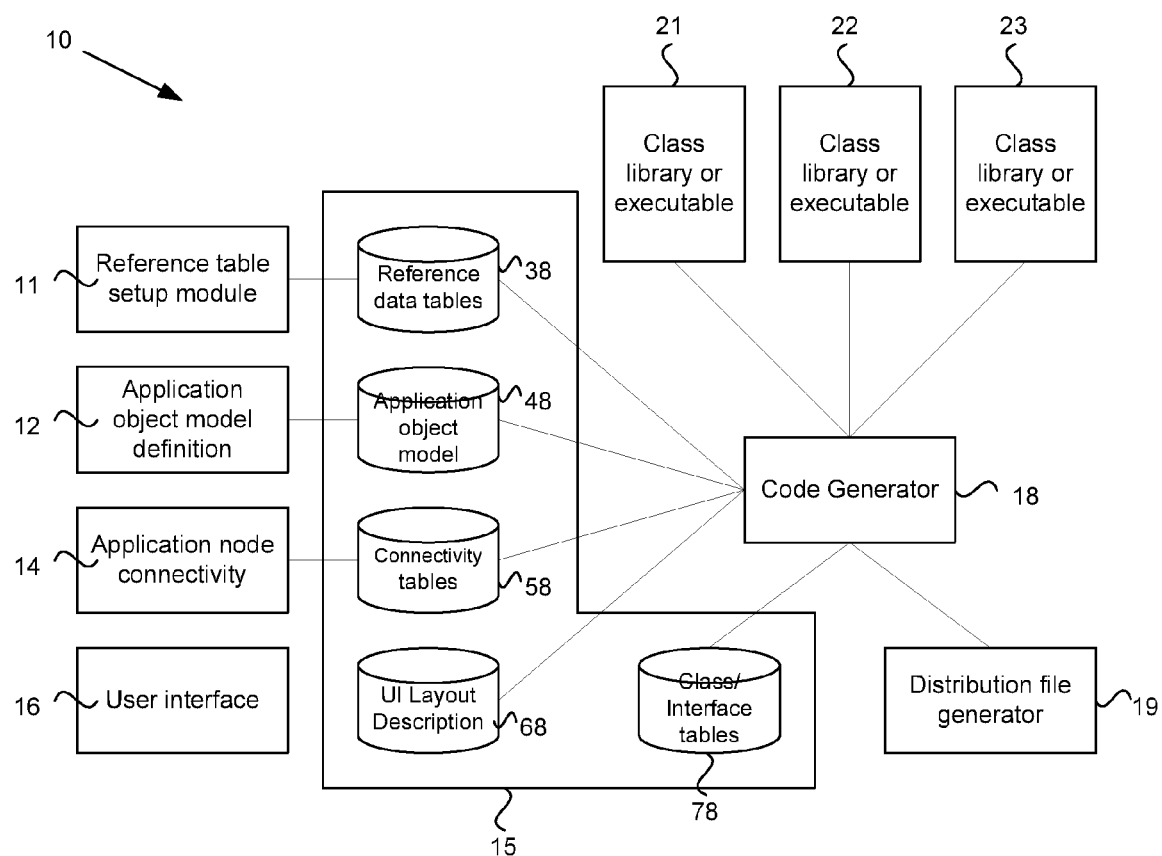
FIG. 3 shows a system for generation of pervasive applications.

The above described processes may be performed using an application development system 10 as illustrated in FIG. 3. The development system 10 may include a plurality of software modules including a reference table setup module 11, an application object model module 12, an application node connectivity module 14, a user interface module 16, a source code generation module 18 and a distribution file generation module 19. The development interface 10 also includes one or more databases 15 for storing pervasive meta-data and application data in various tables 38, 48, 58, 68, 78, as will be described in more detail below.

Figure 4:
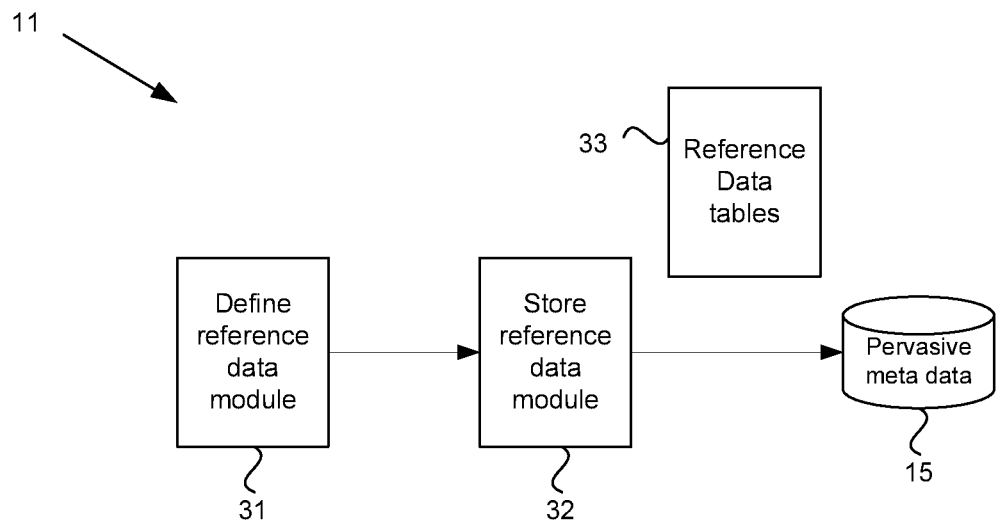
FIG. 4 shows a reference data module.

The reference table setup module 11 is shown in more detail in FIG. 4. The reference table module 11 operates to provide a user interface by which a user, such as an application developer, may define pervasive environment reference data 31. This data describes the device types, the device type platforms, networks etc that can be utilized by any application within the organization utilizing the MDA Tool.

Through this module, the enterprise architect, system administrator or application developer can populate tables based on suggestions provided and knowledge of targeted devices, networks, platforms etc. The reference table setup module 11 generates one or more reference data tables 38 that are added 32 to the pervasive meta-data database 15. The reference data tables 38 may be stored in XMI/MOF Format in. The reference data may include the following:

Language Type (Java, .NET Languages, Unmanaged C++, Javascript, PHP . . . );
  Virtual Machine Language Type (JME, JSE, Dalvik, .NET, CF, Silverlight . . . );
  OS Type (Linux, Win Mobile/CE/XP, Unix, Blackberry, MAC/iPhone, Symbian . . . );
  Platform Type (JSE, .NET/CF, Android, Limo, Symbian, Meego, iPhone . . . );
  Network Type (Wire, WiFi, GSM/CDMA, WiMax/LTE, Bluetooth, Zigbee, NFC);
  Database Type (Relational, Object, Object-relational, XML);
  Database Type Instance (SqlLite, DB2, DB2e, Oracle, Oracle Light, DB40);
  Node Type (phone, MID/UMPC, laptop, eBook, setTop, camera, router, smart . . . );
  Node Type Network;
  Protocol Type (SOAP, HTTP, XML-RPC, IIOP, RMI/IIOP, OBEX, REST . . . );
  Protocol Network Type;
  Message Type (JMS, MSMQ, RPC, Socket, DDS etc.);
  Transaction Type (JTS, MTS, OTS, ATMI, CICS/IMS, etc.);
  Serialization Type (Binary, XML, JSON, Character etc.);
  Message Serialization Type.

Figure 5:
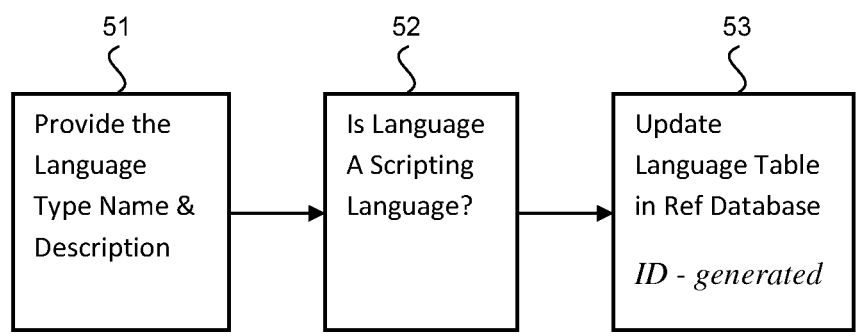
FIG. 5 shows a process for defining a language type.

By way of example, a process for defining the language type is depicted in FIG. 5. The designer provides the language type name and description at step 51 and defines if the language is a scripting language at step 52. A language table in the reference database is then updated with the new language type data at step 53, including generating and storing an ID for the language type. Similar processes may be followed for defining the other types of reference table data mentioned above.

Figure 6:
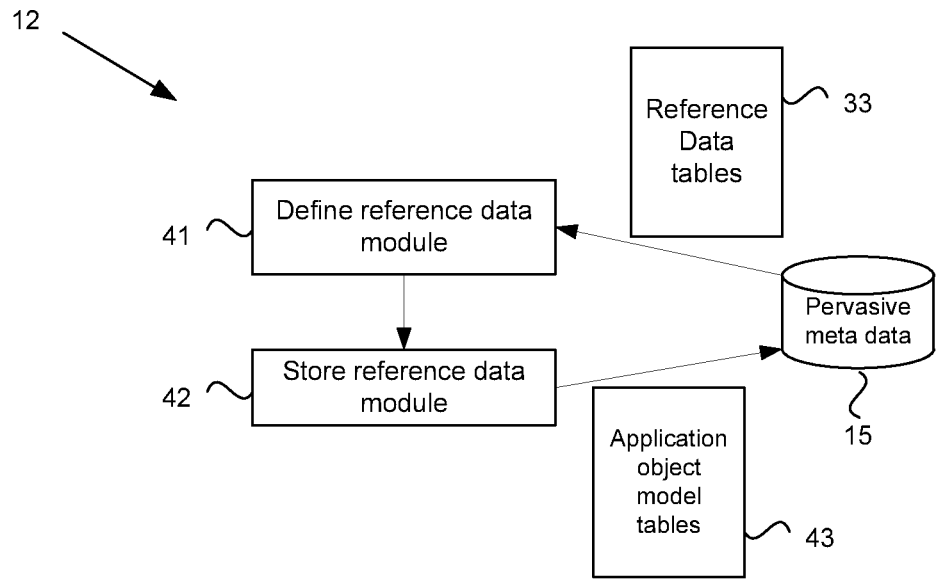
FIG. 6 shows an application object model definition module.

The system 10 includes an Application Object Model Definition module 12 which performs as shown in more detail in FIG. 6. The Application Object Model Definition module 12 provides an interface enabling an application developer to define an object model 41 for the application under development by way of one or more application object model tables 48. When defining the Business Objects, it also needs to be determined if this Business Object is Transaction Aware, and can participate in two-phase commit Transactions. The Application Object Model Definition module 12 may prompt the developer to define:

- Name and Description of Application for which the Object Model applies;
- use cases, interaction and sequence diagrams;
- components;
- packages;
- classes, interfaces, underlying methods etc.;
- if interfaces are remotely accessible? If so, mark with a Remotable interface;
- if classes are mobile? If so, mark with a Serializable interface;
- if classes persistent? If so, mark with a Persistent interface;
- if classes are location-aware? If so, mark with a Location-Aware interface;
- if classes/interfaces are transactionable? If so, mark as Transaction aware;
- if classes are sharable/whiteboard-able? If so, mark as Whiteboard aware.

In prompting the developer for these definitions, the Application Object Model Definition module 12 may make reference to the reference data tables 38 stored in the database. Once the object model has been defined for the application, the Application Object Model Definition module 12 stores the provided definitions as meta-data in one or more application object model tables 48 in the database 15. The object model may be stored in XMI/MOF Format including data for:

- Application
- Application UI Type (NA, SWT/eSWT, .NET, Java/ActionScript, PHP.)
- Application Instance UI Type (NA, SWT/eSWT, .NET, Java/ActionScript . . . )
- Application Component
- Application Component Package
- Class
- Interface
- Interface Parent
- Class Attribute
- Class Method
- Interface Method
- Method Argument
- Exception
- Method Exception
- Class Method Source To define an application, a designer may initially define an application include a name and description. The application may be given an application ID which is added to an application table in the Application Object Model database. The designer may then provide an application UI type name and description, which is also assigned an ID and added to an Application UI Type table in the Application Object Model database in association with the application ID for the application. Any Application Instance UI types can be similarly defined.

Figure 7:
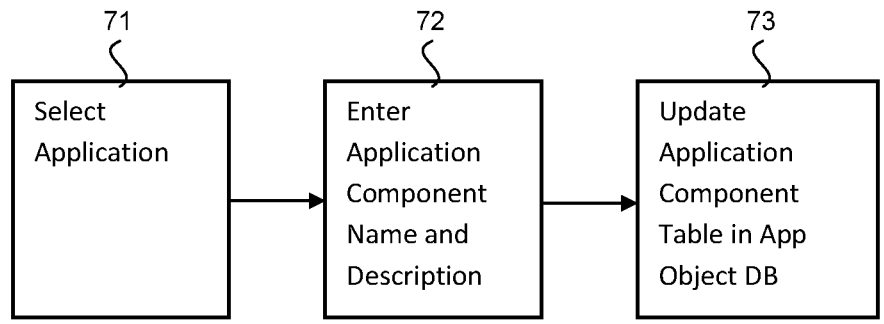
FIG. 7 shows a process for defining an application component.

A process for defining an application component is depicted in FIG. 7. The designer selects through the development interface the application that is being developed (step 71). The designer then enters the application component name and a description of the application component (step 72). At step 73, the defined application component is added to the application component table in the application object model database. Application Component Packages can be defined for an application component by selecting the application and the application component and then entering the application component package name and description. The Application Component Package data is then added to an Application Component Package Table in the Application Object Model database.

Figure 8:
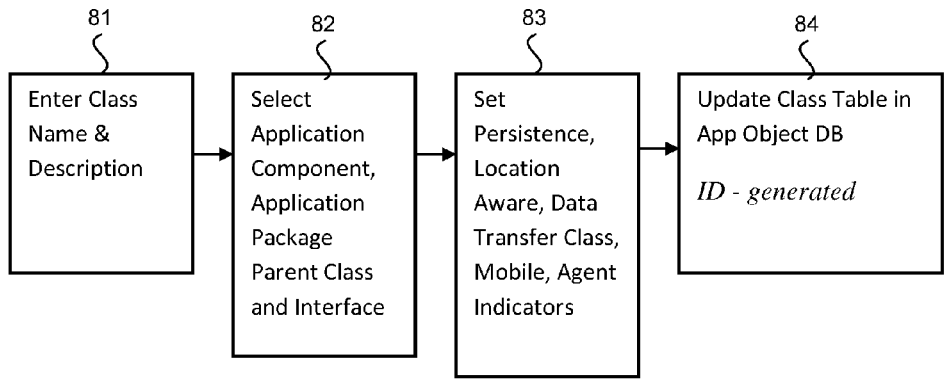
FIG. 8 shows a process for defining parameters of an application component.

The designer may then define any classes for the application component package following a process depicted in FIG. 8. At step 81, the designer enters the class name and description. The designer then selects the application component, application component package, parent class and interface for this class (step 82). The designer may then provide indicators that specify whether the class is persistent, location aware and mobile as well as data transfer class and agent indicators (step 83). The data is then stored in a class table in the application object database (step 84). Data for each of the application parameters and components mentioned above may be added in a similar manner to the process depicted in FIG. 8. Data fields for each of the respective application object model data tables is provided in an example database schema described below. When defining the User Interface, it also needs to be determined if this User Interface will be remotely accessible to other Peers and Peer Groups.

The system 10 may include a User Interface Definition module 16 which may provide an interface to receive inputs from the application developer. Through this interface, the developer may:

a) Select an Application Node;
b) Describe Classes that are accessible via UI;
c) Describe whether classes allow for Create, Read, Update, Delete, Search (CRUDS);
d) Wire UI Javascript functions/methods/events to corresponding native Business Object Class methods that allow for bidirectional communication between native application logic and Javascript/HTML presentation layer;
e) Define if the interface is remotely accessible and sharable amongst Peers and Peer groups.

Figure 9:
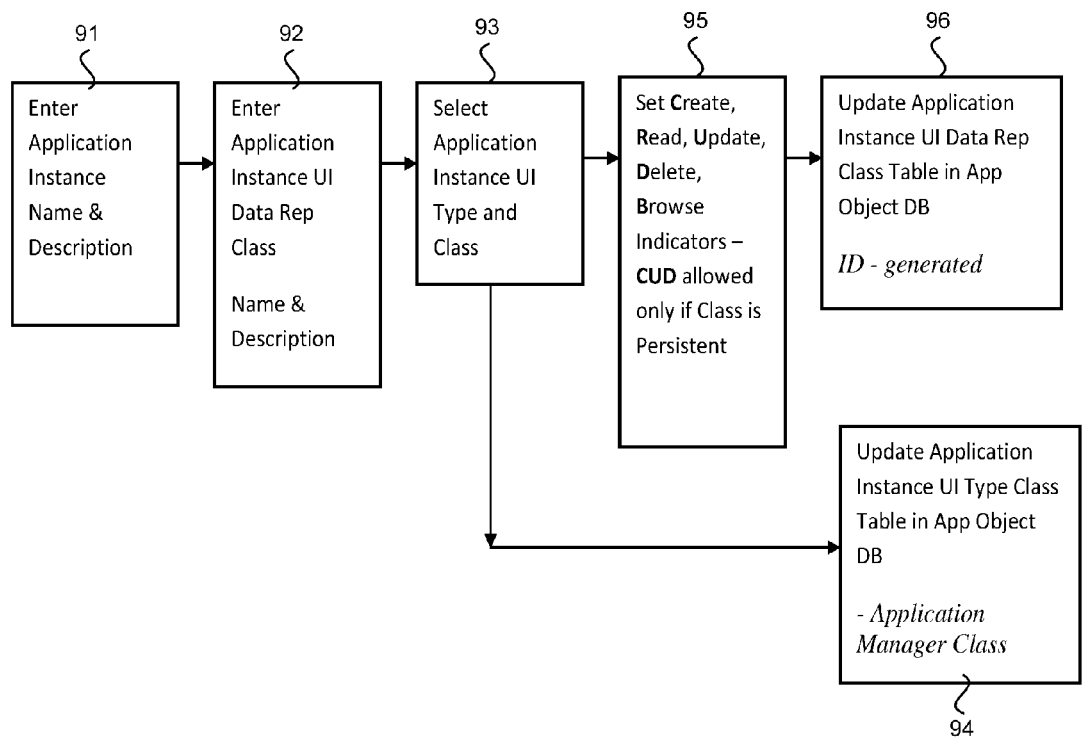
FIG. 9 shows a process for defining an application instance UI data representation class.

The meta-data provided via the User Interface Definition module 16 may be stored in one or more Application Instance User Interface tables 68. The meta-data stored may include:

- Application Instance UI Data Representation Class;
- Application Instance UI WebView Page Source;
- Application Instance UI WebView JavaScript Function;
- Application Instance UI WebView Source Callback;

An example schema for the UI tables is provided in the sample database schema below. A process for defining the application instance UI data representation class is depicted in FIG. 9. At step 91, the developer enters the application instance name and description. The developer then enters the respective application instance UI data representation class and name and description (step 92). The developer then selects an application instance UI type and class (step 93). After selection, the application instance UI type class table is updated (step 94). The developer then sets the CRUDs and Browse indicators (step 95) (CUD indicators only being set if the class is persistent). These indicators are then updated in the relevant table in the Application Object Database (step 96).

Figure 10:
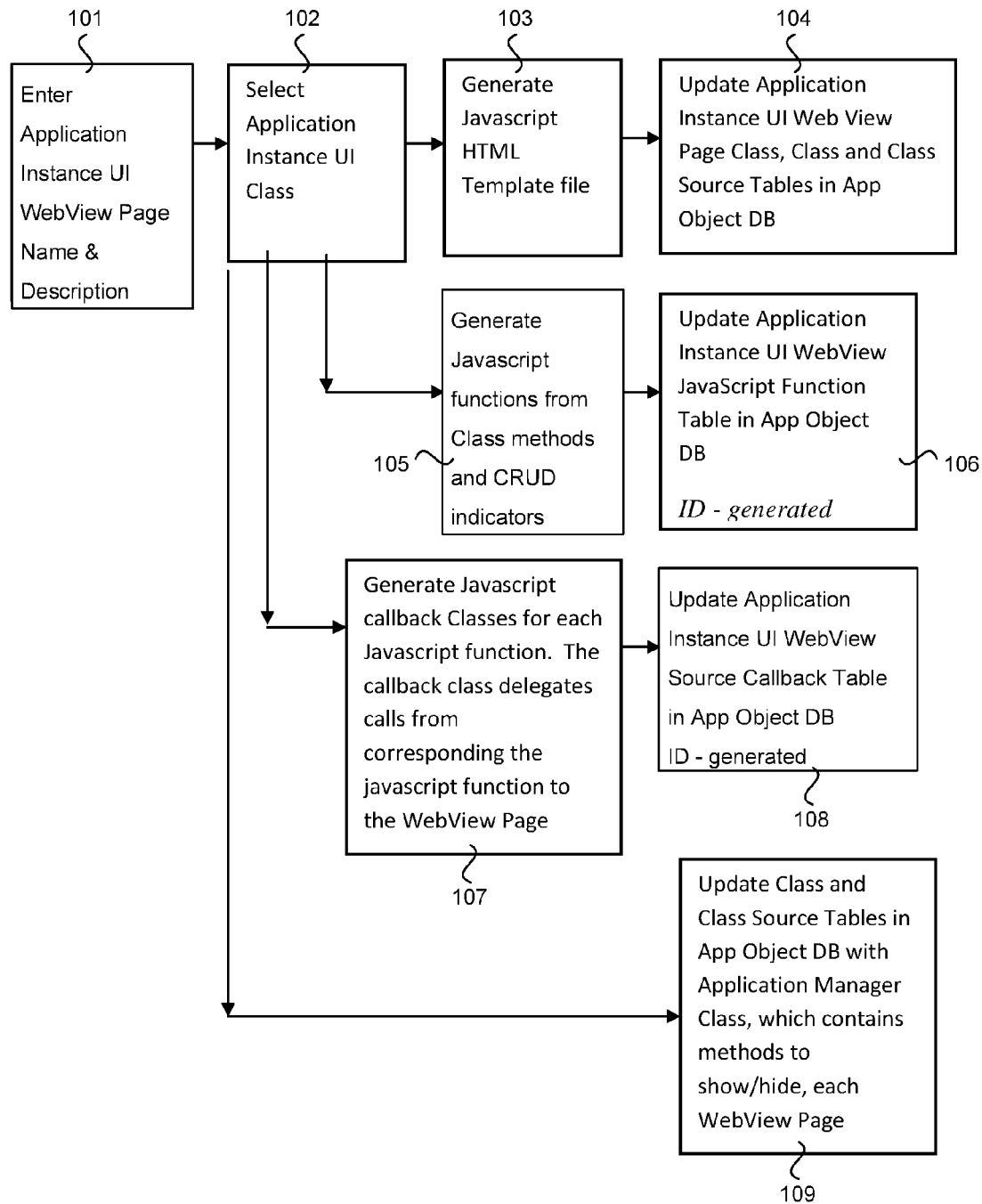
FIG. 10 shows a process for defining an application instance UI Webview Source callback.

A process for defining the application instance UI Webview Source callback is depicted in FIG. 10. At step 101, the developer enters the application instance UI webview page name and description. The developer then sets the application instance UI class (step 102). A javascript HTML template file is then generated (step 103) which is used to update the class and class source tables for the application instance UI web view page class (step 104). At step 105, the javascript functions are generated from the class methods and CRUD indicators and used to update the Application Instance UI WebView JavaScript Function Table in the application object database (step 106). At step 107 the Javascript callback Classes for each Javascript function are generated. The callback class delegates calls from the corresponding javascript function to the WebView Page. This data is added to the respective Application Instance UI Source Callback table (step 108). At step 109, the Class and Class Source Tables in application object database are updated with Application Manager Class, which contains methods to show/hide each WebView Page.

The application development system 10 may include an Application Node Connectivity module 14 that provides an interface configured to receive input from the application developer that defines Application Node Types as well as connectivity between the node types. The developer may indicate node types in various ways, such as by selecting from drop down menus that reference defined node types in the reference data tables 38, by drag & drop into an application window, etc. A target type may have subtypes. For example, a mobile device type may have subtypes such as MiD, UMPC, Smartphone, PND, etc.

The Application Node Connectivity module 14 may also enable the application developer to define Peer-2-Peer Connectivity between node types. For example, the user may select two Application Nodes, select or indicate Network Type(s) between the Application Nodes and then select or indicate Distributed Protocol Type(s) between both Application Nodes. The network types and distributed protocol types may be indicated by selecting the available types from data provided in the reference data tables 38.

The Application Node Connectivity module 14 may also enable the application developer to define Peer-2-Group Connectivity. Through this interface, the developer may:
  a) Select Application Nodes participating in Group;
  b) Provide Group Name;
  c) Specify Node that host Group;
  d) Select Network Type(s) between both Application Nodes;
  e) Select Distributed Protocol Type(s) between both Application Nodes; and
  f) Select Messaging Type(s) between both Application Nodes.

The meta-data provided via the Application Node Connectivity module 14 may be stored in the pervasive meta-data database 15 in one or more application node connectivity tables 58. The connectivity tables may include fields for
  Node Type Application;
  Peer-2-Peer Link;
  Peer-2-Peer Link Dist Protocol;
  Group;
  Group Node Type;
  Peer-2-Group Protocol.

To enable the application developer to describe the node connectivity, the system 10 may provide information from the reference data tables 38 as well as definitions from the Application Object Model tables 48. An example schema for the connectivity tables discussed above is provided below.

Figure 11:
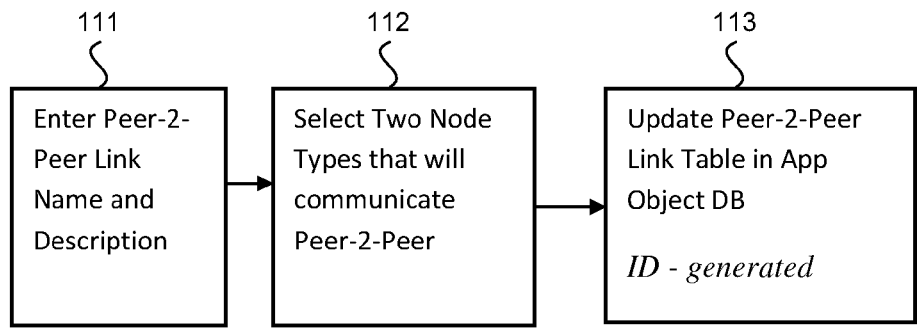
FIG. 11 shows a process for defining a peer-to-peer link.

A process for defining a peer-to-peer link is depicted in FIG. 11. At step 111, the developer enters a peer-to-peer link name and description. The developer then selects two node types that will communicate peer-to-peer (step 112). This information is then added to a peer-to-peer link table in the application object database (step 113).

Figure 12:
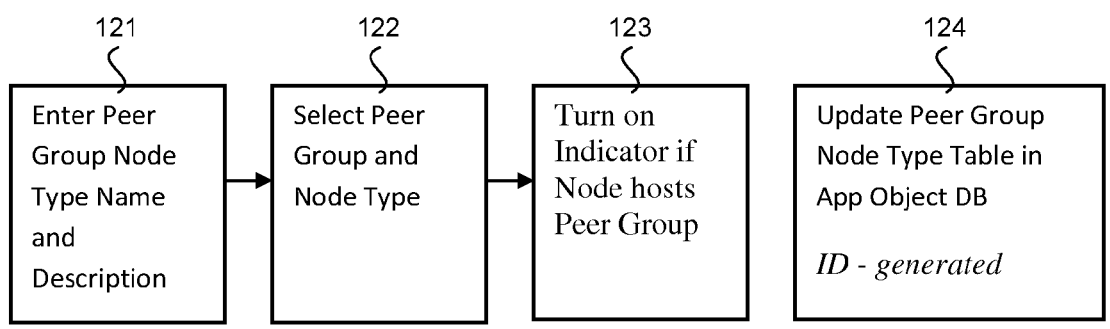
FIG. 12 shows a process for defining a peer group node type.

A process for defining a peer group node type is depicted in FIG. 12. At step 121, the developer enters a peer group node type name and description. The developer then selects a peer group node type (step 122). If the selected node type hosts a peer group, an indicator is turned on (step 123). The data is then updated to a peer group node type pay table in the application object database (step 124).

The system 10 may include a Generate Source Code module 18. The generate source code module 18 is the module that produces the application code based upon the definitions provided by the application developer in the respective tables 48, 58, 68 and with reference to the reference data tables 38. Once the definitions for the application have been provided, the Generate Source Code module 18 reads all of the tables (i.e. tables 38, 48, 58, 68) as well as tables joined from other repositories. In the code generation phase, the code generator module 18 generates the source code and either byte code or machine code for the specified target types. The Code Generator accesses class libraries or executables 21, 22, 23 which are provided per target type. The code generator 18 may generate the whole application or parts of the application.

Figure 13:
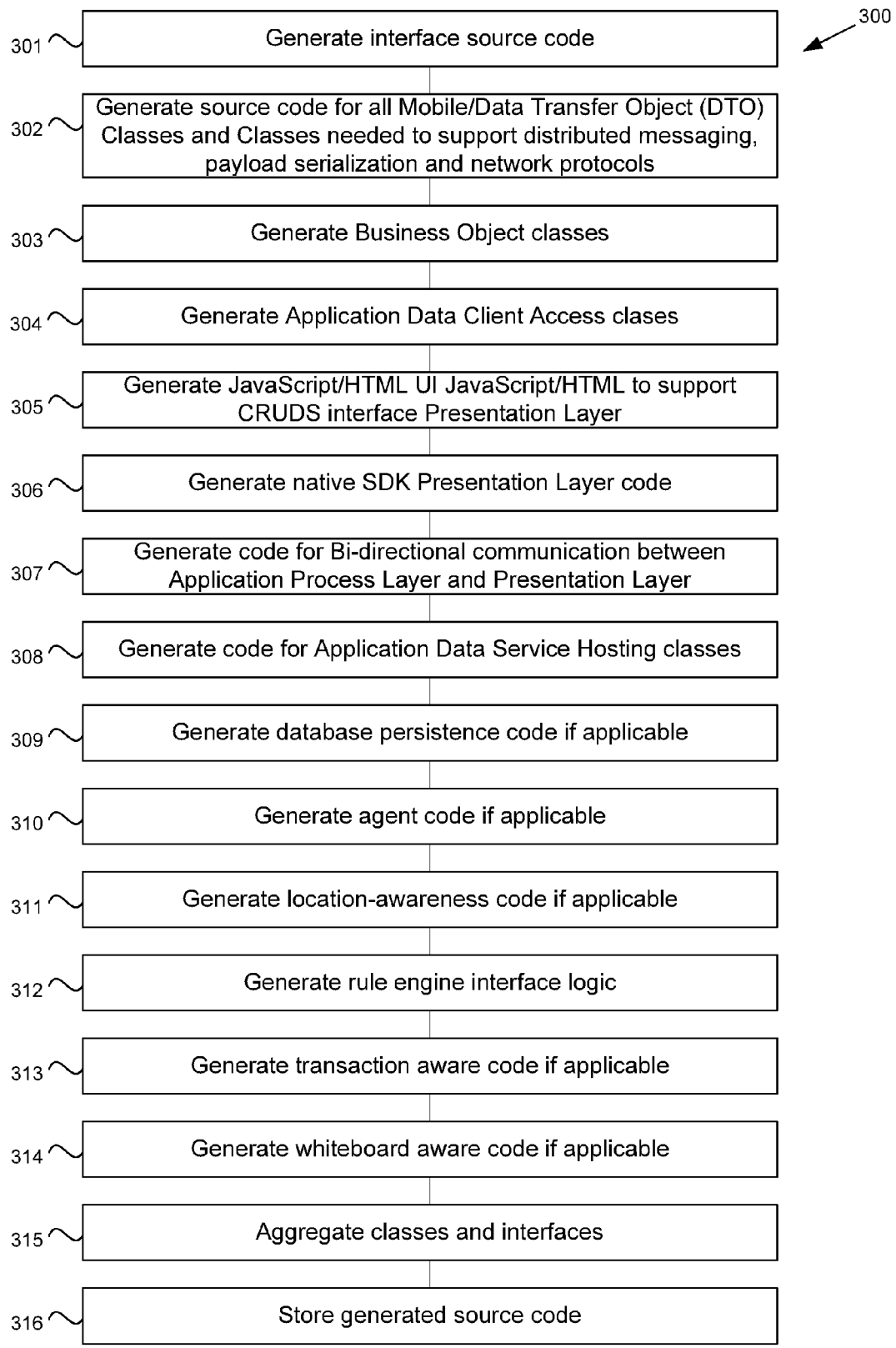
FIG. 13 shows a method for generating code for a pervasive application.

For each node type of the application node connectivity table 58, the generate source code module 16 generates code for the node type using the application class library or executable library 21, 22, 23 for that node type. The process for generating the source code is depicted in the flowchart 300 of FIG. 13. At step 301, the code generator module 18 generates all Interface source code. This is generated from the Application Object tables 23, 31, 32, 38, 34, and put in table 35b.

At step 302, the code generator module 18 generates source code for all Mobile/Data Transfer Object (DTO) Classes and Classes needed to support various distributed messaging, payload serialization and network protocols. The source code is generated using the data from the Application Object Model tables 22, 23, 25, 30, 32, 38 and 34.

These classes represent the data (complex objects) that is passed/returned as part of method invocations and responses. This process utilizes the Universal Serialization Sub-Module/API of the Pervasive Computing Platform described in U.S. application Ser. No. 13/151,671, referenced above. The Universal Serialization API is accomplished by interfaces and accompanying methods that are implemented for a DTO to be universally Serializable. The DTO classes are generated with these interfaces/methods implemented. These methods utilize the Universal Serialization Sub-Module/API of the Pervasive Computing Platform. At step 303, the code generator module 16 reads the Application Object Model tables 22, 23, 25, 30, 32, 38 and 34 and generates Business Object Classes with stubbed out business process methods.

At step 304, the code generator module processes the data tables to generate Application Data "Client" Access classes that allow for access to any node (P2P) or group of nodes (P2Group) using any protocol specified in the application node connectivity tables.

For P2P, the code generator module 18 utilizes the Universal Service Discovery/Access/Host Sub-Module/APIs of Pervasive Computing Platform. These modules provide the capability for services running on a device, to be discovered via any other devices by name (White Pages) or description (Yellow Pages).

For P2Group, the code generator module 18 utilizes the Universal Pub/Sub Group Messaging Sub-Module/API of Pervasive Computing Platform. These modules provide the capability for devices to invoke method services on each other in a Peer-2-Peer manner, or can publish/subscribe Universal Business Objects (i.e. Universally Serializable DTOs) to virtual groups of heterogeneous devices.

The Universal Pub-Sub API may include the following interface.

1) An Interface which allows you to Publish/Subscribe to data by Topic:
 a) void close( )
 b) Object getAddress( )
 c) Object getListener( )
 d) Object getSession( )
 e) Object receive( )
 f) Object receive(String selector)
 g) List receiveAll( )
 h) void releaseResources( )
 i) void removeAll( )
 j) Object request(Object payload)
 k) void send(Object payload)
 l) void sendAll (List payloads)
 m) void setListener(MessageListener listener)

2) A Callback Interface which allows you to receive messages:
 a) boolean on Message(Object message).

There is Pub-Sub Messaging Factory, which loads an instance of the appropriate class that implements the above Pub-Sub interface; based on the platform the application is running on and configuration settings describing the type of publish and subscribe messaging capability desirable on such a platform.

The implementation class is exposed as a remotely accessible object via the first interface described above. The object is bound to the Universal Directory, with a well-known name. From that point on the local application communicates with the Universal Pub-Sub Messaging interface described above. Remote nodes can communicate with the remotely accessible interface, by discovering it via the Universal Directory, based on its well-known name.

At step 305, the code generation module 18 generates JavaScript/HTML UI JavaScript/HTML to support CRUDS interface Presentation Layer.

At step 306, the code generate module 18 generates Native SDK Presentation Layer code to provide/interact with JavaScript/HTML code to/with underlying Web Engine is also generated leveraging the Universal User Interface Sub-Module/API of the Pervasive Computing Platform. This module provides a UI API that allows for communicating bi-directionally with the platforms underlying web-engine (WebKit, IE/Silverlight etc) via JavaScript and support HTML 5. It allows for Bi-directional communication between Application Process Layer and Presentation Layer utilizing Universal API's of Pervasive Computing Platform.

The Universal UI Interface may include two interfaces.

1) A remotely accessible Interface, which represents the type of actions that can be done to render or access a User Interface's state
 a. loadHtmlData (String htmlAndJavascript)—updates the WebView with HTML provided
 b. loadUrl (String aUrl)—updates the WebView with the contents from the URL provided
 c. updateHtml(String aHtmlObjectName, String aHtmlObjectValue)-
 d. addJavascriptInterface(Object aCallbackObject, String aCallbackName)

2) A locally accessible Interface, which represents additional actions that are needed to interact with the underlying user interface engine
 a. setContext(Object)—set the application context for the Universal UI
 b. addPageToApplicationFrame(Object, Object)—adds the WebView Page to the Application Frame
 c. getNativeBrowserUIObject( )—returns the native Browser WebView UI Object There is Universal UI Factory, which loads an instance of the appropriate class that implements the above interfaces; based on the platform the application is running on. The implementation class is exposed as a remotely accessible object via the first interface described above. The object is bound to the Universal White Pages, with a well-known name. From that point on the local application simply communicates with the Universal UI interface described above. Remote nodes can communicate with the remotely accessible interface, by discovering it via the Universal White Pages, based on its well-known name.

At step 307, the code generation module 18 generates code for Bi-directional communication between Application Process Layer and Presentation Layer utilizing Universal API's of Pervasive Computing Platform. At step 308, the code generation module 18 generates Application Data Service Hosting classes for any services hosted on a device. This process leverages the Universal White Pages, Yellow Pages and Peer-2-Peers Sub-Modules/API of Pervasive Computing Platform. This step includes generating any Proxy classes that are responsible for serialization/de-serialization of payload (object reference, method arguments, exceptions and return values. These Proxy classes communicate with underlying Universal Core Request Brokering Sub-Module/API of the Pervasive Computing Platform.

For those classes marked as persistent, the corresponding database persistence code is generated at step 309, leveraging the Universal Database Sub-Module/API of the underlying Pervasive Computing Platform.

The Universal UI Database consists of:

1) An Interface, (UniversalDBAction) which represents the type of actions that can be done on a database:
 a) UniversalDBAction addUpdate(String dbQuery);—adds an update query
 b) UniversalDBAction addUpdate(String dbQuery, Object[ ] replacementParms);—adds an update query with replacement parameters
 c) UniversalDBAction addQuery(String dbQuery, Object type);—adds a query with an object that will contain the result set for each row
 d) UniversalDBAction addQuery(String dbQuery, Object type, Object[ ] replacementParms);—adds a query with query parameters and with an object that will contain the result set for each row,
 e) UniversalDBAction addQuery(String dbQuery, Object[ ] replacementParms);
 f) UniversalDBAction addQuery(String dbQuery);—adds a Query
 g) int sqlSize( );—gets the size of the current set of SQL statements
 h) UniversalDBAction clear( );—clears the current set of SQL statements
 i) List execute(IJDBCProperties info);—executes the current set of SQL statements There is Database Factory, which loads an instance of the appropriate class that implements the above interfaces; based on the platform the application is running on and configuration settings describing the desired database type. The implementation class is exposed as a remotely accessible object via the first interface described above. The object is bound to the Universal White Pages, with a well-known name. From that point on the local application simply communicates with the Universal Database interface described above. Remote nodes can communicate with the remotely accessible interface, by discovering it via the Universal White Pages, based on its well-known name.

For those classes marked as agents, the corresponding agent code is generated at step 310, leveraging the Universal Agent Sub-Module/API of the underlying Pervasive Computing Platform.

The Universal Agent Interface may include:

1) An Agent Interface, which represents the type of actions that can be done on a Software Agent:
   a. void addBehaviour(Behavior b)—adds a new behavior to the agent.
   b. void afterMove( )—Actions to perform after moving.
   c. void beforeMove( )—placeholder shall be overridden by user defined agents to execute some actions before the original agent instance on the source container is stopped (e.g. releasing local resources such as a GUI).
   d. Message blockReceive( )—receives an ACL message from the agent message queue.
   e. Message blockReceive(long millis)—Receives an ACL message from the agent message queue, waiting at most a specified amount of time.
   f. void activate( )—Make a state transition from suspended to active or waiting (whichever state the agent was in when doSuspend( ) was called) within Agent Platform Life Cycle.
   g. void clone(Location destination, String newName)-Make this agent be cloned on another location.
   h. void delete( )—Make a state transition from active, suspended or waiting to deleted state within Agent Platform Life Cycle, thereby destroying the agent.
   i. void move(Location destination)—Make this agent move to a remote location.
   j. void suspend( )—Make a state transition from active or waiting to suspended within Agent Platform Life Cycle; the original agent state is saved and will be restored by a doActivate( ) call.
   k. void wait( )—Make a state transition from active to waiting within Agent Platform Life Cycle.
   l. void wait(long millis)—Make a state transition from active to waiting within Agent Platform Life Cycle.
   m. void wake( )—Make a state transition from waiting to active within Agent Platform Life Cycle.
   n. State getAgentState( )
   o. ID getID( )—queries the private Agent ID.
   p. ID getAMS( )—Get the Agent ID for the platform AMS.
   q. Object[ ] getArguments( )—Get the array of arguments passed to this agent.
   r. Object getController( )—Return a controller for the container this agent lives in.
   s. ID getDefaultDF( )—Get the Agent ID for the platform default DF.
   t. String getHap( )—queries the Home Agent Platform.
   u. String getName( )—queries the agent complete name (GUID).
   v. Location here( )—retrieves the location this agent is currently at.
   w. boolean is Restarting( )—returns true when this agent is restarting after a crash.
   x. void postMessage(Message msg)—Put a received message into the agents queue.
   y. void putBack(Message msg)—Puts a received ACL message back into the queue.
   z. Message receive( )—Receives an ACL message from the agent message queue.
   aa. void removeBehavior(Behavior b)—removes a given behavior from the agent.
   bb. void send(Message msg)—Send an ACL message to another agent.
   cc. void setQueueSize(int newSize)—Set message queue size.
   dd. void setup( )—empty placeholder for application specific startup code.
   ee. void takeDown( )—empty placeholder for application specific cleanup code.

There is an Agent Factory, which loads an instance of the appropriate class that implements the above interface; based on the platform the application is running on, as well as configuration information describing any particularly desired agent platform. The implementation class is exposed as a remotely accessible object via the first interface described above. The object is bound to the Universal White Pages, with a well-known name. From that point on the local application communicates with the Universal Agent interface described above.

For those classes marked as location-aware, the corresponding location awareness code is generated at step 311, leveraging the Universal Location & PIM Sub-Module/API of the underlying Pervasive Computing Platform.

For those classes methods associated with rule sets, the corresponding logic to interface with the rule engine is generated at step 312, leveraging the Universal Rules Sub-Module/API of the underlying Pervasive Computing Platform.

For those classes marked as transaction aware, the corresponding source code is generated at step 313, leveraging the Universal Transaction Sub-Module API of the underlying pervasive computing platform. The Universal Transaction Interface allows for two-phase-commit transactions, which can span multiple instances and types of Transaction Servers. This API can be used to deliver rule-sets incrementally, within the context of a transaction, to pervasive nodes that are participating in rule-driven whiteboard/collaborative applications. A specific implementation of the enterprise transaction server(s) is utilized via a configuration file.

The types of Transaction Servers supported are Java Transaction Servers (JTS), Object Transaction Servers (OTS), Microsoft Transaction Servers (MTS), Application Transaction Monitoring Interface (ATMI-based) and Mainframes (IMS/CICS) though other transaction servers may become available and still others may be apparent to a person skilled in the art. The Universal Transaction API may be created from an abstraction of the API's that exist for the common and prominent types of transaction servers. Implementations of that interface can then be created that can communicate with the most common commercial and open-source implementations of transaction servers.

Figure 14:
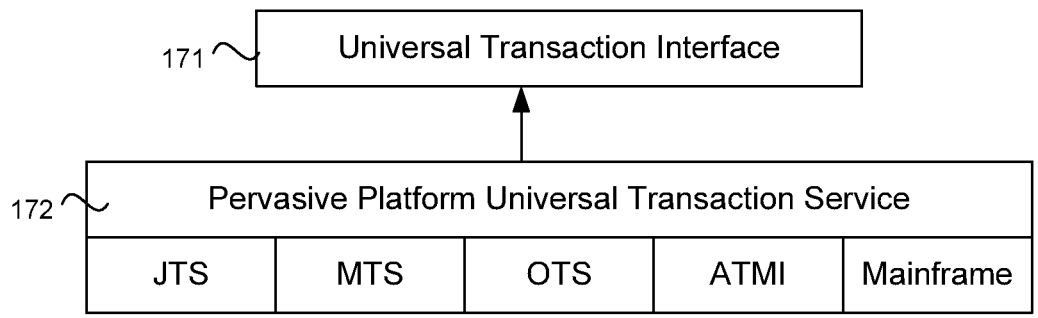
FIG. 14 shows a universal transaction API.

An embodiment of the Universal Transaction Service API is depicted in FIG. 14. The Universal Transaction API may include:

1) An Interface 171, which represents the type of actions that can be done on a Transaction:
   a. void begin( )—Create a new transaction and associate it with the current thread.

b. void commit( )—Complete the transaction associated with the current thread.
c. int getStatus( )—Obtain the status of the transaction associated with the current thread.
d. void rollback( )—Roll back the transaction associated with the current thread.
e. void setRollbackOnly( )—Modify the transaction associated with the current thread such that the only possible outcome of the transaction is to roll back the transaction.
f. void setTransactionTimeout(int seconds)—Modify the value of the timeout value that is associated with the transactions started by the current thread with the begin method.

There may be a Transaction Factory 172, which loads an instance of the appropriate class that implements the above interfaces; based on the platform the application is running. The implementation class is exposed as a remotely accessible object via the first interface described above. The object is bound to the Universal White Pages, with a well-known name. From that point on the local application communicates with the Universal Transaction interface described above. Remote nodes can communicate with the remotely accessible interface, by discovering it via the Universal White Pages, based on its well-known name.

For those classes marked as whiteboard-aware, the corresponding whiteboard support code is generated at step 314, leveraging the Universal Whiteboard Sub-Module/API of the underlying Pervasive Computing Platform. The system may include a Universal Whiteboard Interface that allows for Transaction-Aware Universal Business Objects to be shared amongst heterogeneous, dynamic communities of devices. The implementation supports objects having read/write access permissions, configurable lease, lock, and stale times, configurable policy-based access, with default policies for security, location and role/permissions.

Figure 15:
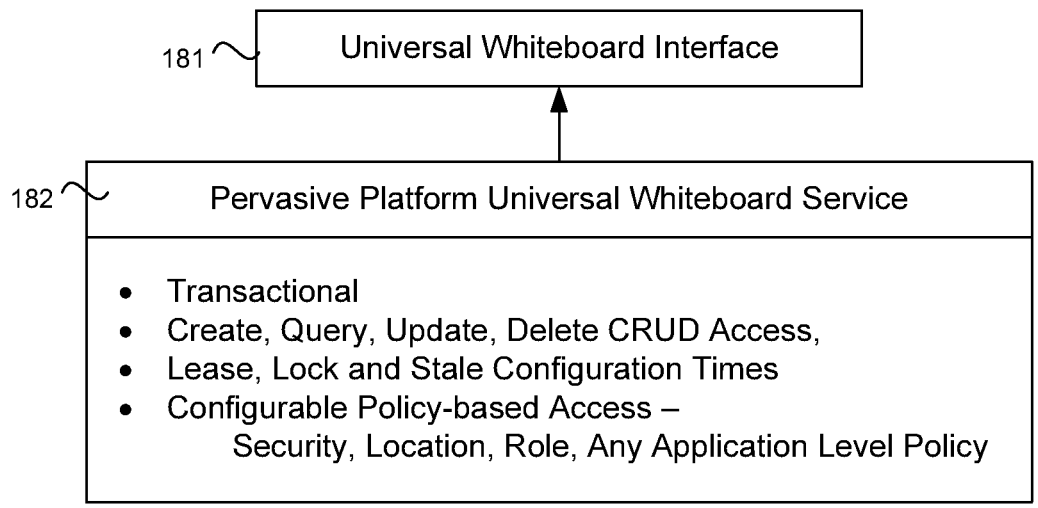
FIG. 15 shows a universal whiteboard API.

An embodiment of the Universal Whiteboard API is depicted in FIG. 15. The Universal Whiteboard API may include:
1) An Interface 181, which represents the type of actions that can be done on a Whiteboard:
   a. Object[ ] query(Object template)—Query for objects that match this template returning an array of such from the whiteboard
   b. WhiteboardLock lock(long lease, Object whiteboardObject)—Lock this whiteboard object.
   c. Object updateNotify(Object template, WhiteboardCallback callback, long lease)—When entries are written that match this template notify the given listener with a Callback that includes the handback object.
   d. Object update(Object entry, Transaction txn, long lease)—Write an existing object into the Whiteboard.
   e. Object create(Object entry, Transaction txn, long lease)—Write a new Object into the Whiteboard.
   f. Object read(Object template, Transaction txn, long timeout)—Read any matching Object from the Whiteboard, blocking until one exists.
   g. Object readIfExists(Object template, Transaction txn, long timeout)—Read any matching Object from the Whiteboard, returning null if there is currently is none.
   h. Object serialize(Object e)—The process of serializing an Object for transmission to a Whiteboard service
   i. Object delete(Object template, Transaction txn, long timeout)—Remove a matching Object from the Whiteboard, waiting until one exists.
   j. Object deleteIfExists(Object template, Transaction txn, long timeout)—Take a matching Object from the Whiteboard, returning null if there is currently is none.

2) A WhiteBoardLock class:
   a. void cancelLock( )—Used by the lease holder to indicate that it is no longer interested in the resource
   b. long getLockExpiration( )—Returns a long indicating the time the lease will expire.
   c. void renewLock(long duration)—Renews a lease for an additional period of time, specified in milliseconds.
3) A WhiteBoardCallback class:
   a. public Object getWhiteboardObject( )—gets the WhiteboardObject that was updated
   b. public void setWhiteboardObject(Object whiteboardObject)—sets the WhiteboardObject that was updated
   c. public long getTime( )—gets the time when the WhiteboardObject was updated
   d. public void setTime(long aTime)—returns the time when the WhiteboardObject was updated There is a Whiteboard Factory 182, which loads an instance of the appropriate class that implements the above interfaces; based on the platform the application is running. The implementation class is exposed as a remotely accessible object via the first interface described above. The object is bound to the Universal White Pages, with a well-known name. From that point on the local application communicates with the Universal Whiteboard interface described above. Remote nodes can communicate with the remotely accessible interface, by discovering it via the Universal White Pages, based on its well-known name.

At step 315, the Classes and Interfaces are aggregated based on the packages they were associated with duration definition of the Object Model for the application, i.e. as described in the Application Object Model tables 48 described above.

Finally, at step 316 generated source code for the node type may be stored in Class/Interface Tables 78 in the database 15. The Class/Interface Tables may define:
   Class Method Source;
   Application Instance UI WebView Page Source;
   Application Instance UI WebView JavaScript Function;
   Application Instance UI WebView Source Callback.

The Universal Transaction API and Universal Whiteboard API may form part of a universal set of APIs that provides a hardware-independent agent software abstraction layer of the pervasive software computing platform as described in U.S. application Ser. No. 13/151,671, referenced above. As described in that patent application, the API Abstraction layer operates between a network layer, representing the most common type of wired and wireless networks (a.k.a. Networks), and an operating platform layer which represents the most common Operating Systems and software platforms (Operating Systems/Platforms).

The system 10 may include an Application Node Type Distribution File Generation Module 19. This module generates the corresponding application distribution file (Midlet JAD, Windows Mobile CAB, Android APK, Apple APP, Blackberry COD, etc) based on device type, platform type and selected language. Classes and Interfaces are put into libraries based on the Components they were associated with during definition of the object model for the application. The module 19 associates specific node instances to deploy files and stores Application Node Type Distribution File in Deployment Tables including:
   Node Application Component;
   Node Application Deployment File.

Examples tables are provided in the sample database schema discussed below.

Figure 16:
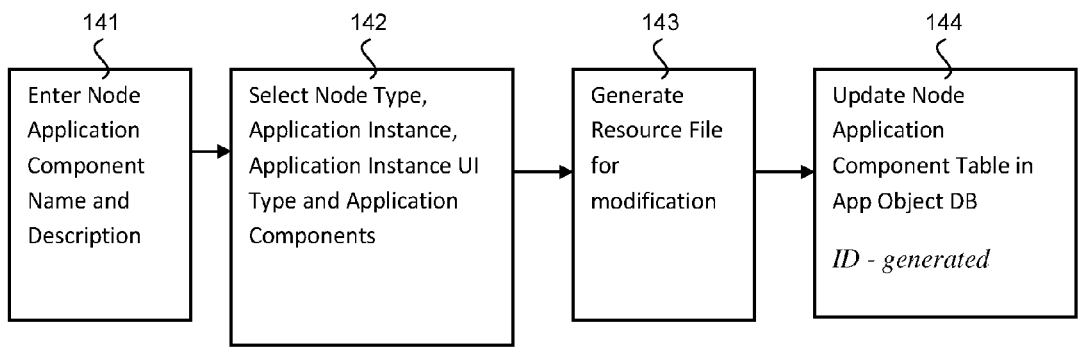
FIG. 16 shows a process for generating a node application component.
Figure 17:
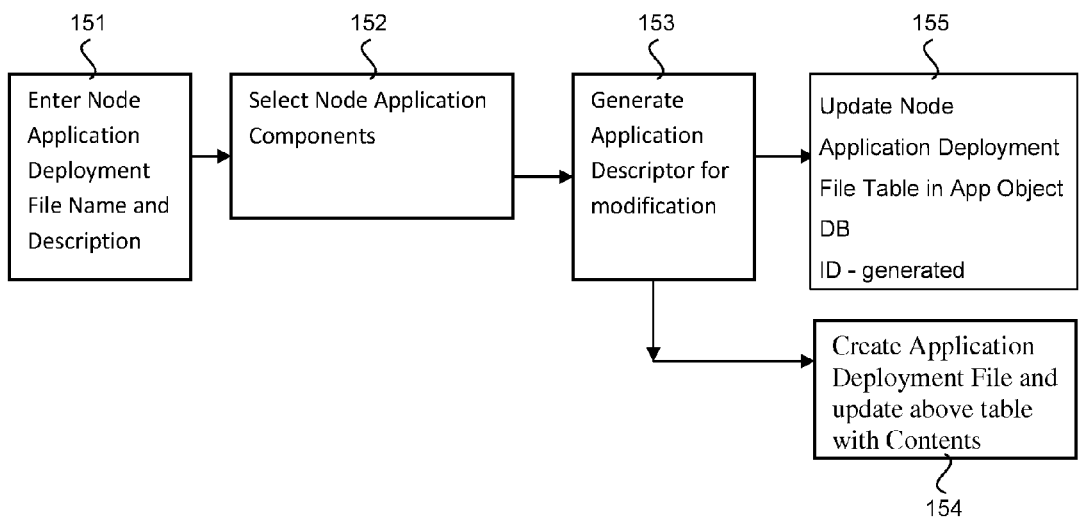
FIG. 17 shows a process for generating a node application deployment file.

A process for generating the node application component is depicted in FIG. 16. At step 141, the developer enters the node application component name and description. The developer then selects node type, application instance, application instance UI type and application components for an application component (step 142). At step 143, the generation module 19 generates the resource file for modification. The application component table is then updated with the resource file data (step 144). A process for generating the node application deployment file is depicted in FIG. 17. At step 151, the developer enters the node application deployment file name and description and selects the node application components (step 152). At step 153 the generation module 19 generates the application descriptor for modification and then creates the application deployment file (step 154). The node application deployment file table is then updated (step 155).

The Application Node Type Distribution File Generation Module 19 may also be responsible for generating the data and files required to deploy Application Deployment File to Specific Devices. The data required may be provided in tables including:

Node Instance;
Node Instance Application Deployment File.

Figure 18:
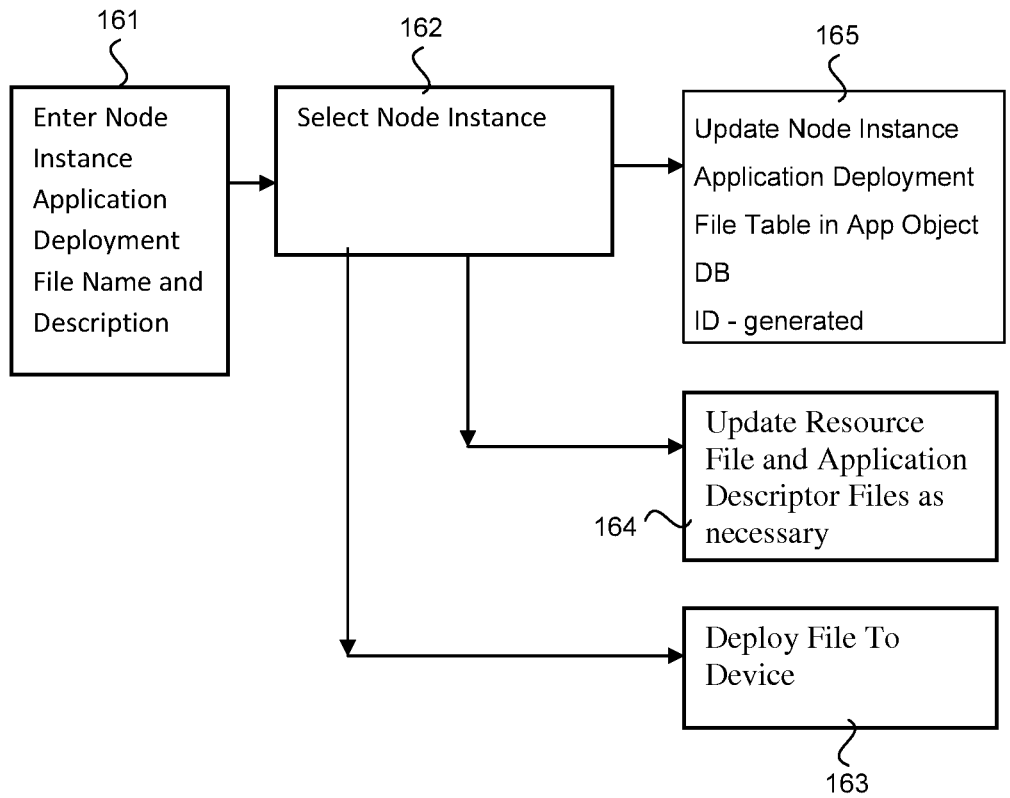
FIG. 18 shows a process for deploying the files to the devices.

A process for deploying the files to the devices is depicted in FIG. 18. At step 161, the developer enters the node instance application deployment file name and description and selects a node instance (step 162). The deployment file for the selected node instance is then deployed to the relevant device (step 163). In addition, the resource file and application description files are updated as necessary (step 164) and the node instance application deployment file table is updated (step 165).

As described above, the data, meta-data and application code may be stored as one or more tables in one or more databases, such as the database 15. An example database design may be as follows:

1) Language Type (Java, .NET Languages, Unmanaged C++, Javascript, PHP . . . )
Id
Name
Description
Scripting Language
2) Virtual Machine Language Type (JME, JSE, Dalvik, .NET, CF, Silverlight . . . )
Id
Name
Description
Language Type ID
3) OS Type (Linux/Unix, WinMobile/CE/XP, Blackberry, Mac, Symbian, TinyOS)
Id
Name
Description
Preferred Language ID
Alternate Language ID
4) Platform Type (JSE, .NET/CF, Android, Limo, Symbian, Meego, iPhone . . . )
Id
Name
Description
OS Type ID
Virtual Machine Language Type ID
5) Network Type (Wire/WiFi, GSM/CDMA, WiMax/LTE, Bluetooth, Zigbee, NFC)
Id
Name
Description
Supports IP V4
Supports IP V6
6) Database Type (Relational, Object, Object-relational, XML)
Id
Name
Description
7) Database Type Instance (Sqlite, DB2, DB2e, Oracle, Oracle Light, DB40)
Id
Name
Description
Database Type ID
8) Rules Engine Type (RETE, other)
Id
Name
Description
Language Type ID
9) Rules Engine Type Instance (Drools, JRules, Jess, Advisor, Oracle BRules . . . )
Id
Name
Description
Database Type ID
10) Node Type (phone, netbook, laptop, eBook, setTop, camera, router, sensor . . . )
Id
Name
Description
Platform Type
Database Instance ID
Screen Size (can be NA—i.e. faceless)
11) Node Type Network (node can support many network types)
Id
Node Type ID
Supported Network Type ID
12) Protocol Type (SOAP, HTTP, XML-RPC, IIOP, RMI/IIOP, OBEX, REST . . . )
Id
Name
Description
IP based
13) Protocol Network Type
Id
Name
Description
IP based
Protocol ID
Network Type ID
14a) Message Type (JMS, MSMQ, RPC, Socket, DDS etc.)
Id
Name
Description
IP based
Protocol Network Type ID
14b) Transaction Type (JTS, MTS, OTS, ATMI, CICS/IMS etc.)
Id
Name
Description
Two-phase commit
15) Serialization Type (Binary, XML, JSON, Character etc.)
Id
Name
Description 16) Message Serialization Type
Id
Name
Description
Message Type ID
Serialization Type ID
17) Application
Id
Name
Description
18) Application UI Type (NA, SWT/eSWT, .NET, Java/ActionScript, PHP.)
Id
Name
Description
19) Application Instance UI Type (NA, SWT/eSWT, .NET, Java/ActionScript . . . )
Id
Name
Description
Application ID
Application UI Type ID
Application Manager Class ID
20) Application Component
Id
Name
Description
Application ID
21) Application Component Package
Id
Name
Description
Application ID
Component ID
22) Class
Id
Name
Description
Persistence Ind
Location Aware Ind
Data Transfer Class Ind
Mobile Ind
Agent Ind
Transaction Aware Ind
Whiteboard Aware Ind
Application ID
Component ID
Package ID
Parent Class ID
23) Interface
Id
Name
Description
Remotely Accessible Ind
Application ID
Component ID
Package ID
Transaction Aware Ind
24) Class Attribute
Id
Name
Description
Type
Scope (private, public, protected etc)
Static-Instance
Final 25) Rule Set
Id
Name
Description
Rule Engine Type Instance ID
26) Rule
Id
Name
Description
Pseudo-code
27) Rule Property
Id
Name
Description
Value
28) Rule for Rule Set
Id
Name
Description
Rule Set ID
29) Class Method
Id
Name
Description
Return Type
Class ID
Rule Set ID
Pseudo-code
30) Interface Method
Id
Name
Description
Return Type
Interface ID
31) Method Argument
Id
Name
Description
Type
InOut/Out/In indicator
Method ID
Final
32) Exception
Id
Name
Description
Type
38) Method Exception
Id
Method ID
Exception ID
34) Class Source
Id
Name
Description
Class ID
Language Type ID
Source Code
35) Interface Source
Id
Name
Description
Interface ID
Language Type ID
Source Code 36) Class Method Source
Id
Name
Description
Class Method ID
Language Type ID
Source Code
37) Node Type Application
Id
Node Type ID
Application ID
38) Peer-2-Peer Link
Id
Name
Description
Node Type 1 ID
Node Type 2 ID
39) Peer-2-Peer Link Dist Protocol
Id
Name
Description
Peer-2-Peer Link ID
Message Serialization Type ID
40) Peer Group
Id
Name
Description
41) Peer Group Node Type
Id
Name
Description
Peer Group ID
Node Type ID
Hosts Community Ind
42) Peer-2-Group Protocol (groups can communicate using many Protocols)
Id
Name
Description
Group ID
Message Serialization Type ID
43) Application Instance UI Data Representation Class
Id
Name
Description
Application Instance UI Type ID
Class ID
Create Ind
Read Ind
Update Ind
Delete Ind
Browse Ind
Remotely Accessible Ind
44) Application Instance UI WebView Page Source
Id
Name
Description
Application Instance UI Type ID
Application Instance UI WebView Class ID
JavaScript Html Source
Remotely Accessible Ind
45) Application Instance UI WebView JavaScript Function
Id
Name
Description
Application Instance UI WebView ID
JavaScript Function Name
JavaScript Source
46) Application Instance UI WebView Source Callback
Id
Name
Description
Application Instance UI Web View Source ID
"JavaScript-to-native Callback" Class ID
Application Instance UI WebView JavaScript Function ID
47) Node Application Component
Id
Name
Description
Node Type ID
Application Instance ID
Application Instance UI Type ID
Application Component Package ID
Resource File Template
48) Node Application Deployment File
Id
Name
Description
Node Application Component
Application Descriptor Template
49) Node Instance
Id
Name
Description
Node Type ID
49) Node Instance Application Deployment File
Id
Name
Description
Node Application Deployment File ID
Node Instance ID
Application Deployment File Contents
Recourse File Contents
Application Descriptor Contents The embodiments described herein may be completely decentralized and ad-hoc, and would be useful for business, consumer and governmental business applications, gaming applications, etc. Additionally the platforms and MDA tools described herein and in the Applicant's cross referenced patent applications allow for these types of applications to be built quickly, while supporting a wide array of devices.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for creating pervasive applications executable by a plurality of node types, the method comprising:
capturing a meta-data definition of an application into an application definition module, the meta-data definition describing at least the plurality of node types, the meta-data definition further comprising whether a class of the application is transaction aware;
automatically generating the code per node type for the plurality of node types in a code generation module, comprising transaction aware code that enables the application to participate in two phase commit transactions;
compiling the code per node type; and
generating the packaging necessary to deploy the application to the plurality of node types;
wherein capturing the meta-data comprises capturing whether the application is persistable wherein capturing meta-data definition comprises capturing a definition of peer-to-peer messaging including network type and protocol preference, and wherein generating the code comprises generating the code that enables the application to communicate peer-to-peer in accordance with the captured network type and protocol preference.

2. The method of claim 1 wherein capturing the meta-data comprises capturing whether a class of the application is shareable.

3. The method of claim 2 wherein generating the code comprises generating shareable code that enables the class to be shared to peers and peer-groups.

4. The method of claim 1 wherein capturing the meta-data comprises capturing a messaging type between node types.

5. The method of claim 1 comprising capturing a definition of peer-to-group messaging including network type and protocol preference.

6. The method of claim 1 wherein capturing meta-data comprises describing the Application Object Model and describing it through an Object Model Repository.

7. The method of claim 1 wherein capturing the meta-data comprises capturing an object model of the application and capturing meta-data for the object model.

8. The method of claim 1 wherein capturing the meta-data comprises capturing whether the application is location-aware.

9. The method of claim 1 wherein capturing the meta-data comprises capturing whether the application is mobile.

10. A system for generating applications comprising a processor operatively coupled to at least one memory, the processor programmed to execute:
an application object model definition module that provides an interface to receive inputs from a user that define an object model for an application comprising whether a class of the application is transaction aware and whether the application is persistable; and
a code generator module that generates the application code for an object model of an application defined through the application object model definition module comprising transaction aware code that enables the application to participate in two phase commit transactions and code that creates the application as persistable
an application node connectivity module that captures a meta-data definition of an application, wherein capturing meta-data definition comprises capturing a definition of peer-to-peer messaging including network type and protocol preference, and wherein generating the application code comprises generating the application code that enables the application to communicate peer-to-peer in accordance with the captured network type and protocol preference.

11. The system of claim 10 comprising the application node connectivity module that allows a user to define node types to participate in an application, wherein the code generator module generates application code for the object model for each of the node types.

12. The system of claim 10 comprising one or more class or executable libraries per node type, wherein the code generator module generates the application code for a node type with reference to the respective one of the class or executable libraries.

13. The system of claim 10 wherein the application object model definition module is configured to capture meta-data of an application comprising whether a class of the application is shareable.

14. The system of claim 13 wherein the code generator module generates shareable code that enables a shareable class to be shared to peers and peer-groups.

15. The system of claim 13 wherein the meta-data comprises at least one indicator that indicates whether the application is mobile.

16. A pervasive computing platform comprising: a processor and memory; a device API Abstraction layer configured to operate as an interface between one or more applications operating on a device and an operating platform of the device, the device API abstraction layer comprising a universal set of APIs, the universal set of APIs comprising a transaction API that provides an abstraction of a universal set of transaction engines and defines the application as persistable wherein the transaction API (Application Programming Interface) captures a meta-data definition of an application, wherein capturing meta-data definition comprises capturing a definition of peer-to-peer messaging including network type and protocol preference, and wherein generating the application code comprises generating the application code that enables the application to communicate peer-to-peer in accordance with the captured network type and protocol preference.

17. The pervasive computing platform of claim 16 wherein the universal set of APIs comprises a whiteboard API that provides an abstraction of a universal set of whiteboard engines.

* * * * *